(12) United States Patent
Sarukkai (10) Patent No.: US 9,196,310 B2
(45) Date of Patent: *Nov. 24, 2015

(54) SYSTEMS AND METHODS FOR INDEXING AND SEARCHING DIGITAL VIDEO CONTENT

(75) Inventor: Ramesh R. Sarukkai, Union City, CA (US)

(73) Assignee: YAHOO! INC., Sunnyvale, CA (US)

(*) Notice: Subject to any disclaimer, the term of this patent is extended or adjusted under 35 U.S.C. 154(b) by 475 days.

This patent is subject to a terminal disclaimer.

(21) Appl. No.: 13/104,327

(22) Filed: May 10, 2011

(65) Prior Publication Data

US 2011/0211814 A1 Sep. 1, 2011

Related U.S. Application Data

(63) Continuation of application No. 11/416,014, filed on May 1, 2006, now Pat. No. 7,965,923.

(51) Int. Cl.
| | |
|---|---|
| *H04N 5/84* | (2006.01) |
| *H04N 5/89* | (2006.01) |
| *H04N 9/80* | (2006.01) |
| *G11B 27/28* | (2006.01) |
| *G06F 17/30* | (2006.01) |

(52) U.S. Cl.
CPC .......... *G11B 27/28* (2013.01); *G06F 17/30787* (2013.01); *G06F 17/30796* (2013.01); *G11B 2220/2562* (2013.01)

(58) Field of Classification Search
USPC .......................... 386/230, 240, 248–251, 332
See application file for complete search history.

(56) References Cited

U.S. PATENT DOCUMENTS

| | | | |
|---|---|---|---|
| 8,539,529 B2* | 9/2013 | Sloo | 725/53 |
| 2006/0212897 A1* | 9/2006 | Li et al. | 725/32 |
| 2008/0072256 A1* | 3/2008 | Boicey et al. | 725/46 |

* cited by examiner

*Primary Examiner* — Nigar Chowdhury
(74) *Attorney, Agent, or Firm* — Pillsbury Winthrop Shaw Pittman LLP (57) ABSTRACT

The present invention relates to systems and methods for indexing digital video content maintained on a storage media item. The method of the present invention comprises extracting caption and subtitle content from one or more video object ("VOB") files maintained on the storage media item. The extracted caption and subtitle content are segmented into one or more segments and video and audio content corresponding to the one or more segments are extracted. Descriptions of the video and audio content corresponding to the segmented caption and subtitle content are generated. The captions, subtitles, descriptions, and corresponding video and audio content associated with the one or more segments of the one or more VOB files are indexed.

21 Claims, 4 Drawing Sheets

SYSTEMS AND METHODS FOR INDEXING AND SEARCHING DIGITAL VIDEO CONTENT

CLAIM OF PRIORITY

This application is continuation of and claims benefit to U.S. Ser. No. 11/416,014, filed on May 1, 2006, and is hereby incorporated by reference herein in its entirety.

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for facilitating the indexing and searching of content. More specifically, the present invention provides methods and systems for indexing and searching content maintained on media for storing digital video content, such as one or more digital video or digital versatile discs ("DVD").

The World Wide Web ("Web") provides a large collection of interlinked content items in various formats, including documents, images, video and other media content. As the Web has grown, the ability of users to search this collection and identify content items relevant or responsive to a given query has become increasingly important, with a number of search service providers existing to meet this need. In general, a search provider publishes a web page via which a user coupled to the Internet may submit a query indicating terms in which the user is expressing an interest. In response to the query, the search service generates and transmits to the user a list of links to Web pages or locations of content items that are relevant to the query, typically in the form of a search results page.

In addition to content being stored on the Internet, audio and video content are frequently stored using optical storage techniques on various storage media items, such as DVDs. A single DVD can store a significant quantity of data and may comprise one or more DVD Video Object files ("VOB"). Each DVD VOB file comprising a given DVD may store video and audio content, as well as subtitles, lyrics, credits, captions, titles, etc. For example, a given movie on a DVD may comprise a given number of DVD VOB files, each containing video and audio content, as well as corresponding subtitles and captions.

As DVDs grow in adoption and consumption, there is an increasing need to index DVD content so that a user may select to view an entire DVD from a collection of DVDs, as well as select one or more individual scenes, images, clips, etc., from a given DVD. Current techniques for locating a particular DVD or a particular item of content maintained on a given DVD require familiarity with the DVD title or other unique identifier associated with the DVD. Additionally, once a given DVD is identified or located, the content on the DVD must be traversed in order to locate a particular item of content on the DVD, such as a five second clip of a movie maintained on a DVD. For example, a viewer of a DVD movie that wishes to view a particular scene of the movie must traverse the one or more DVD VOB files comprising the DVD movie in order to locate the desired scene.

While the Internet provides users with the ability to search the Web for content including web pages, documents, files, etc., Internet users are currently unable to search for content maintained on the numerous commercially available DVDs. Though Internet users may search for information on a given DVD using identifiers such as title, actor(s) or genre, Internet users are unable to search for particular items of content within a given DVD, such as video clips, audio clips, thumbnails, specific scenes of a movie, etc.

As the popularity of DVDs increases, there is a growing need to index the content maintained on the numerous commercially available DVDs and to allow Internet users to search across such content. Current search techniques, however, fail to provide Internet users with the ability to locate specific items of content on a given DVD. In order to overcome shortcomings associated with existing searching techniques, embodiments of the present invention provide systems and methods for extracting and indexing the content maintained on a given DVD, and providing users of client devices with the ability to search among the indexed DVD content.

SUMMARY OF THE INVENTION

The present invention is directed towards methods and systems for indexing digital video content maintained on a storage media item. According to one embodiment of the invention, the method comprises extracting caption and subtitle content from one or more video object ("VOB") files maintained on a storage media item, wherein a storage media item may comprise a digital video disc ("DVD"). According to one embodiment of the invention, the extracted caption and subtitle content comprise ASCII characters forming one or more terms or phrases. According to another embodiment of the invention, the extracted caption and subtitle content comprise Unicode characters forming one or more terms or phrases. The extracted subtitle content comprises a textual translation of a dialogue in a given VOB file. The extracted caption content comprises a textual description of the non-dialogue audio content in a given VOB file.

The extracted caption and subtitle content are segmented into one or more segments. According to one embodiment of the invention, the caption and subtitle content are segmented using a time threshold, wherein a time threshold comprises a numerical value indicating a duration of a given segment of caption and subtitle content. According to another embodiment of the invention, the caption and subtitle content are segmented using a size threshold, wherein a size threshold comprises a numerical value indicating the size of a given segment of caption and subtitle content. According to a further embodiment of the invention, the caption and subtitle content are segmented using preexisting divisions in the VOB file associated with the extracted caption and subtitle content. According to yet another embodiment of the invention, the extracted caption and subtitle content are segmented using one or more stop words.

Video and audio content corresponding to the one or more segments are extracted. According to one embodiment of the invention, video and audio content corresponding to a given segment are extracted using start and stop timestamps associated with the given segment. One or more captions and subtitles may be selected from the one or more segments. According to one embodiment of the invention, the one or more captions selected may be selected based upon a display duration of the one or more captions in a given segment.

According to another embodiment of the invention, one or more subtitles are selected based upon a frequency of the one or more subtitles in a given segment.

One or more descriptions of the video and audio content corresponding to the segmented caption and subtitle content are generated using the one or more selected captions and subtitles. According to one embodiment of the invention, generating one or more descriptions comprises querying an index maintaining one or more index entries identifying terms and phrases associated with the selected captions and subtitles. The one or more terms and phrases associated with the one or more selected captions and subtitles are retrieved from the index and used to generate one or more descriptions of the video and audio content corresponding to the selected captions and subtitles.

According to one embodiment of the invention, metadata is extracted from the one or more VOB files maintained on the storage media item. The captions, subtitles, descriptions, and corresponding video and audio content associated with the one or more segments of the one or more VOB files are indexed. According to one embodiment of the invention, the captions, subtitles, descriptions, and corresponding video and audio content associated with the one or more segments of the one or more VOB files are indexed using the metadata associated with the one or more VOB files maintained on the storage media item.

The present invention is further directed towards a system for indexing digital video content maintained on a storage media item. According to one embodiment, the system of the present invention comprises a content acquisition module operative to retrieve one or more video object ("VOB") files maintained on a storage media item. A VOB file maintained on the storage media item may comprise video, audio, subtitle, and caption content. According to one embodiment of the invention, subtitle content comprises a textual translation of a dialogue in a given VOB file, whereas caption content comprises a description of non-dialogue audio content in a given VOB file.

The system of the present invention further comprises an extraction module operative to extract caption and subtitle content from the one or more VOB files. According to one embodiment of the invention, the extraction module extracts caption and subtitle content comprising Unicode characters. According to another embodiment of the invention, the extraction module extracts caption and subtitle content comprising ASCII characters.

The extraction module is further operative to segment the extracted caption and subtitle content into one or more segments. According to one embodiment of the invention, the extraction module is operative to segment the extracted caption and subtitle content from a given VOB file according to preexisting divisions identified in the VOB file. According to another embodiment of the invention, the extraction module is operative to segment the extracted caption and subtitle content from a given VOB file using a time threshold, wherein a time threshold comprises a numerical value indicating a duration of a given segment of caption and subtitle content. According to further embodiment of the invention, the extraction module is operative to segment the extracted caption and subtitle content from a given VOB file using a size threshold, wherein a size threshold comprises a numerical value indicating the size of a given segment of caption and subtitle content. According to yet another embodiment of the invention, the extraction module is operative to segment the extracted caption and subtitle content from a given VOB file using one or more stop words.

The extraction module is operative to identify start and stop timestamps for the one or more segments of extracted caption and subtitle content, and extract video and audio content corresponding to a given segment using the start and stop timestamps associated with the segment. The extraction module is further operative to select one more captions and subtitles from the one or more segments. According to one embodiment of the invention, the extraction module is operative to select one or more captions from a given segment based upon a display duration of the one or more captions in the segment. According to another embodiment of the invention, the extraction module is operative to select one or more subtitles from a given segment based upon a frequency of the one or more subtitles in the segment.

The extraction module is operative to generate one or descriptions of the video and audio content corresponding to the one or more segments. According to one embodiment of the invention, the extraction module is operative to query an index maintaining one or more index entries identifying terms and phrases associated with the selected captions and subtitles. The extraction module retrieves the one or more terms and phrases associated with the selected captions and subtitles and generates one or more descriptions of the video and audio content corresponding to the selected captions and subtitles using the one or more retrieved terms and phrases.

The system of the present invention further comprises an indexing component operative to generate one or more indices maintaining captions, subtitles, descriptions, and corresponding video and audio content associated with the one or more segments of the one or more VOB files. According to one embodiment of the invention, the indexing component is operative to generate an index maintaining captions, subtitles, descriptions and corresponding video and audio content for the one or more segments of the one or more VOB files using one or more items of metadata extracted from the one or more VOB files.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
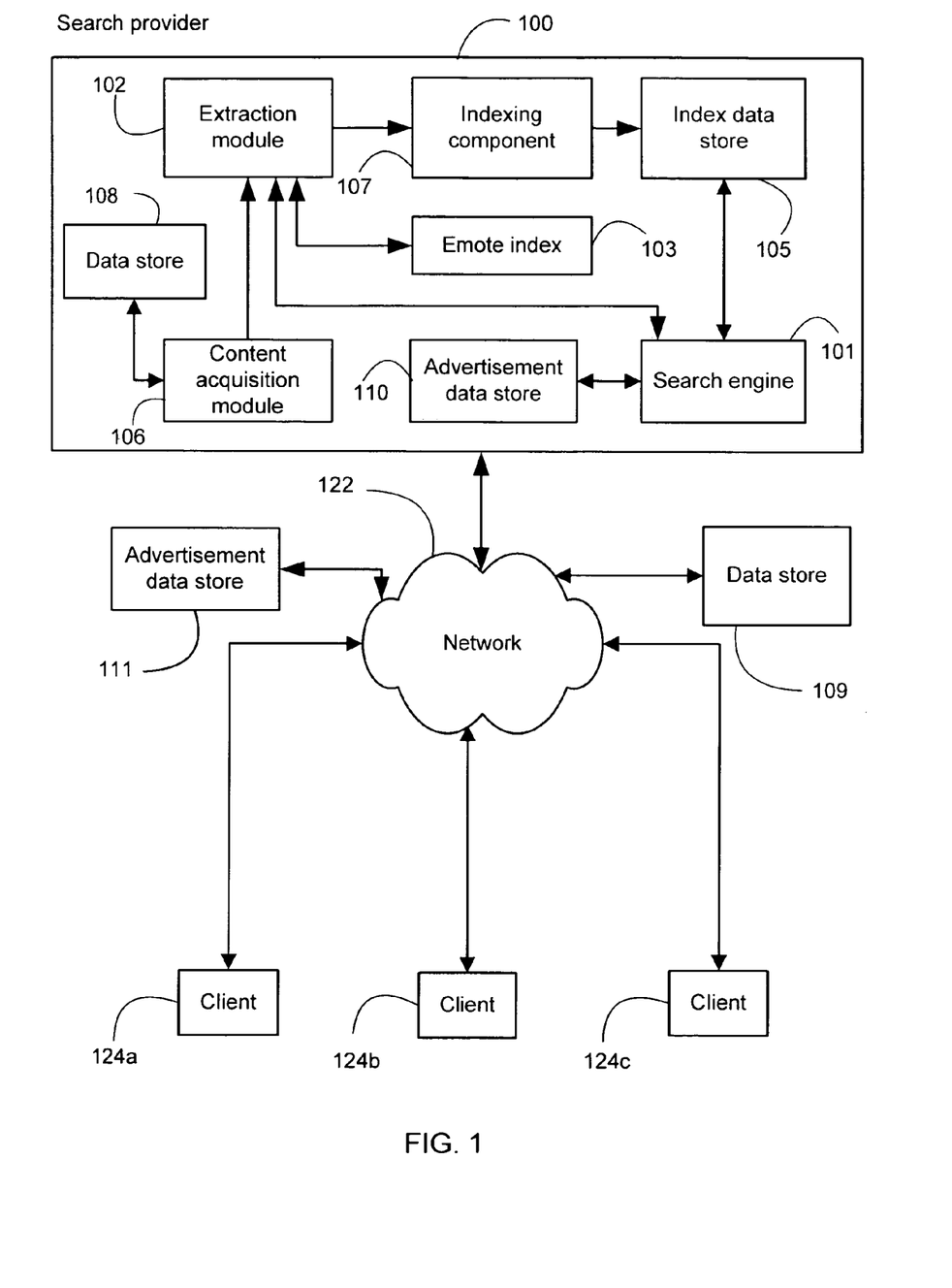
FIG. 1 is a block diagram illustrating a system for extracting and indexing digital video content maintained on a storage media item and providing users of client devices the ability to search among the indexed digital video content according to one embodiment of the present invention.

FIG. 1 presents a block diagram depicting one embodiment of a system for extracting and indexing digital video content maintained on a storage media item. According to the embodiment of FIG. 1, a search provider 100 communicatively coupled to a network 122, which may include a connection to one or more local and/or wide area networks, such as the Internet, includes a content acquisition module 106. The content acquisition module 106 is operative to acquire digital video content maintained on one or more storage media items from one or more local or remote data stores 108 and 109, respectively. Local 108 and remote 109 data stores may be accessible memory structures such as a database, digital storage library, etc., that maintain digital video content. Data stores 108 and 109 may be implemented as databases or any other type of storage structures capable of providing for the retrieval and storage of digital video content. Data stores 108 and 109 may be populated with digital video content using a plurality of techniques. For example, data stores 108 and 109 may be operative to load one or more physical storage media items, extract the one or more Video Object ("VOB") files maintained on the storage media items, and store the one or more VOB files. Similarly, data stores 108 and 109 may be operative to receive the one or more Video Object ("VOB") files comprising a given storage media item via file transfer protocol ("FTP"), email, etc. Those of skill in the art recognize numerous techniques for populating one or more data stores 108 and 109 with digital video content.

According to one embodiment of the invention, the search provider 100 acquires the one or more VOB files comprising a given DVD maintained on local 108 and remote 109 data stores via the content acquisition module 106 and delivers the one or more files to an extraction module 102. The extraction module 102 is operative to receive the one or more DVD VOB files comprising a given DVD and extract or identify metadata associated with the given DVD. According to one embodiment of the invention, the metadata associated with a given DVD comprises one or more items of data describing the DVD content. For example, a given metadata item associated with a DVD may comprise the title of a given show or movie associated with the DVD content. The extraction module 102 may utilize the metadata for a given DVD to characterize or describe the DVD content. The extraction module 102 may also deliver the extracted metadata for a given DVD to a search engine 101 at the search provider 100. The search engine 101 may utilize the metadata for a given DVD VOB file to perform a search, via the network 122, for one or more tags associated with the DVD. For example, the extraction module 102 may deliver the title of the given DVD to the search engine 101. The search engine 101 may utilize the title information associated with the DVD to perform a search of one or more sources for one or more tags associated with the given title. The tags identified by the search engine 101 may comprise descriptions, summarizations, characterizations, etc., of the DVD content associated with the given title and may be used to supplement the metadata associated with the DVD content.

The extraction module 102 is further operative to extract the subtitle and captioning content associated with the one or more DVD VOB files of a given DVD. According to one embodiment of the invention, the extracted subtitle and captioning content obtained by the extraction module 102 comprises one or more terms or phrases in one or more languages. The one or more extracted terms or phrases may comprise characters written in accordance with one or more character encoding systems, such as ASCII or Unicode. The extracted subtitle and captioning content for a given DVD VOB file may comprise one or more terms or phrases that may provide a description or indication of the corresponding video and audio content of the DVD VOB file. According to one embodiment of the invention, the one or more subtitles associated with a given DVD VOB file comprise textual translations of the dialogue in the DVD VOB file. Additionally, the one or more captions associated with a given DVD VOB file comprise textual descriptions of the audio portions of the DVD VOB file that are not dialogue. For example, the subtitles associated with a given DVD VOB file may comprise terms and phrases corresponding to the dialogue in the DVD VOB file, such as "you are so funny," "please walk the dog," etc., whereas the captions associated with the DVD VOB file may comprise terms and phrases corresponding to audio portions of the DVD VOB file that are not dialogue, such as <dog barking>, <loud scream>, <car starting>, etc. Both the subtitles and captions of a given DVD VOB file provide a textual description of the DVD VOB file video and audio content.

The extraction module segments the extracted subtitles and captions for a given DVD VOB file according to one or more techniques. For example, the extraction module may segment the subtitles and captions for a given DVD VOB file based upon a time threshold, generating a segment for every N seconds of subtitle and caption content. Similarly, the extraction module may segment the subtitles and captions for a given DVD VOB file based upon a size threshold, generating a segment for every N bytes of subtitle and caption data for the DVD VOB file. Alternatively, or in conjunction with the foregoing, the extraction module may segment the subtitles and captions for a given DVD VOB file based upon preexisting divisions or partitions identified in the DVD VOB file, such as scene divisions, chapter divisions, etc. Those of skill in the art recognize the plurality of techniques for segmenting subtitles and captions for a given DVD VOB file.

The one or more segments identified by the extraction component 102 have start and stop timestamps that may be used by the extraction module 102 to extract corresponding video clips or thumbnails, wherein a video clip comprises a plurality of video frames and a thumbnail comprises a single video frame. For example, a given segment of caption and subtitle content may have a "start" timestamp of 1:01:32 (1 hour, one minute, and 32 seconds) and a "stop" timestamp of 1:22:02 (1 hour, 22 minutes, and 2 seconds), indicating that the segment comprises twenty one ("21") minutes and thirty ("30") seconds of subtitle and caption content. The extraction module 102 may extract a video clip from the DVD VOB file using the timestamp information associated with the given segment, thus extracting the video clip from the start time 1:01:32 to the stop time 1:22:02. Alternatively, or in conjunction with the foregoing, the extraction module 102 may identify and extract one or more thumbnails based upon the timestamp data associated with the given segment. For example, the extraction module 102 may identify and extract one or more individual video frames appearing between the start and stop timestamps of the given segment.

The extraction module may thereafter traverse the subtitles for a given DVD VOB file segment to select one or more of the subtitle terms or phrases in order to generate one or more descriptions of the corresponding video and audio content according to methods described herein. According to one embodiment of the invention, the extraction module 102 selects subtitle terms or phrases from a given DVD VOB file segment based upon the frequency of the one or more terms or phrases in the DVD VOB file segment. The extraction module may utilize a frequency threshold and select subtitle terms or phrases with a frequency exceeding a given threshold N in a given segment. For example, a given DVD VOB file segment may contain eight ("8") occurrences of the term "car," nine ("9") occurrences of the phrase "step on it," and three ("3") occurrences of the phrase "slow down." The extraction module 102 may be operative to identify the frequency of the one or more terms and phrases in a given segment and select the one or more terms or phrases exceeding a given threshold. With reference to the previous example, the extraction module 102 may select the terms and phrases occurring at least five ("5") times in a given segment, thus resulting in the selection of the term "car" and "step on it." Standard phrase detection techniques may be applied using dictionaries or statistical word co-occurrence models to identify phrases within a given segment.

According to another embodiment of the invention, the extraction module 102 selects subtitle terms and phrases using one or more stop words. The extraction module may be operative to traverse the subtitles for a given segment and select subtitle terms or phrases appearing between stop words. For example, the extraction module 102 may traverse a given DVD VOB file segment and select the subtitle terms or phrases appearing between stop words, such as "and," "the," "it," etc. The one or more selected subtitle terms and phrases may be used to generate one or more descriptions of the corresponding video and audio content according to methods described herein. The extraction module 102 is further operative to traverse and select one or more of the captions within a given DVD VOB file segment.

According to one embodiment of the invention, the extraction module selects one or more captions from a given DVD VOB file segment based upon the display duration associated with a given caption. For example, the extraction module 102 may identify captions with display durations exceeding a given threshold based upon the start and stop timestamps associated with a given caption. Utilizing a display duration threshold may increase the likelihood that a given caption is an accurate description of the audio or video content corresponding to the caption. For example, the extraction module may identify a caption <crying> and another caption <laughing> within a given DVD VOB file segment. Using the timestamp information associated with each respective caption, the extraction module may determine that the caption <crying> is displayed for a period one ("1") second, whereas the caption <laughing> is displayed for a period of twelve ("12") seconds within the DVD VOB file segment. The extraction module 102 may be operative to discard or ignore the <crying> caption and select the <laughing> caption based upon the assumption that a caption displayed for a period of twelve seconds within a given DVD VOB file segment is more likely an accurate description of the DVD VOB file segment video and audio content than a caption displayed for a period of one second.

The extraction module 102 utilizes the selected subtitles and captions to generate "emotes" describing the video and audio content for a given segment, wherein an emote comprises a description or characterization of the video and audio content of a given segment. For example, a given "emote" may comprise the description "funny scene," or the characterization "violent scene" for a given DVD VOB file segment. The selected subtitles and captions for a given DVD VOB file segment may be used to generate emotes describing the corresponding audio and video content for the given DVD VOB file segment.

According to one embodiment of the invention, the extraction module 102 utilizes the selected subtitles and captions to query an emote index 103. The emote index 103 is operative to maintain one or more indices of terms or phrases associated with one or more captions or subtitles. For example, the extraction module 102 may select the caption <woman screaming> and the subtitle phrase "slow down" from a given DVD VOB file segment. The extraction module 102 may thereafter query the emote index 103 to identify one or more terms or phrases associated with the <woman screaming> caption and the subtitle phrase "slow down." The emote index 103 may indicate that the terms "horror," "violent," "scary," etc., are related to the caption <woman screaming>, and the terms "car," "driving," and "chase" are related to the subtitle phrase "slow down." The extraction module 102 may use the terms to generate emotes for the video and audio content for the given DVD VOB file segment. For example, the extraction module 102 may generate emotes for the DVD VOB file segment associated with the <woman screaming> caption and the subtitle phrase "slow down," such as "horror scene," "violent scene", "scary scene," "car chase scene," "driving scene," etc. The extraction module may generate one or more emotes describing the video and audio content associated with the one or more selected captions and subtitles for a given DVD VOB file segment.

There are multiple levels of influences in the selection of captions and subtitles b the extraction module 102. A top level may be the genre and category of the video/media object as a whole (e.g. "The Horror Movie" would be labeled as Comedy category) where an individual segment represents the context of that segment and may be blended with the context of the larger segment of which it is a part. Furthermore, rules of inference may be used to generate the appropriate labels, e.g., comedy movie with "<screaming>" may be labeled as "funny scene" depending on presence of particular keywords or captions in the segment (which may also include previous and next segments).

The extraction module 102 may thereafter deliver the subtitles, captions, and emotes and corresponding video clips and thumbnails for the one or more DVD VOB files comprising a given DVD to an indexing component 107. Additionally, the extraction module 102 delivers the metadata associated with the given DVD to the indexing component 107. The indexing component 107 is operative to generate an index that defines a structure for the one or more segments comprising the one or more DVD VOB files of a given DVD.

According to one embodiment of the invention, the indexing component 107 is operative to generate an index for a given DVD wherein the index defines a structure for the captions, subtitles, and emotes associated with a given video clip or thumbnail for a given DVD VOB file segment. The indexing component 107 may generate an index with entries comprising captions, subtitles, and emotes with corresponding video clip and thumbnail content that allows the search engine 101 at the search provider 100 to identify video clips or thumbnails responsive to a given query. For example, a given entry in an index generated by the indexing component 107 may comprise the caption <laughter>, the subtitle "very funny," the emote "funny scene," and the corresponding video clip or thumbnails. The one or more indices generated by the indexing component 107 may be maintained in an index data store 105.

The indexing component 107 is further operative to utilize the metadata associated with a given DVD to supplement the index entries for the one or more segments comprising the one or more DVD VOB files of the DVD. For example, a given DVD may be associated with the metadata item "title," identifying the title of the DVD content. The indexing component 107 may utilize the title associated with the DVD to define a structure for the one or more segments comprising the one or more DVD VOB files of the DVD. For example, the indexing component 107 may map the one or more segments of the one or more DVD VOB files of the DVD to the metadata item "title" in order to identify the one or more segments as elements of a common DVD.

According to another embodiment of the invention, the indexing component 107 is operative to supplement one or more existing indices maintained in the index data store 105 with captions, subtitles, emotes and corresponding video clips or thumbnails. For example, the indexing component 107 may supplement an existing web index maintaining a plurality of content, such as web pages, documents, URLs, etc. The web index may comprise terms and phrases associated with the content maintained in the web index, such as word/location pairs indicating the web pages, documents, URLs, etc., associated with one or more words. The indexing component 107 may utilize the metadata associated with a given DVD to identify one or more entries in the web index associated with the DVD. For example, the indexing component 107 may identify the one or more word/location index entries in the web index with words that are associated with the DVD metadata. The indexing component 107 may supplement the one or more identified index entries with the one or more segments comprising the one or more DVD VOB files of the DVD.

Alternatively, or in conjunction with the foregoing, the indexing component 107 may utilize the captions, subtitles, and emotes associated with the one or more segments of the one or more DVD VOB files of a given DVD to supplement an existing web index maintained in the index data store 105. As previously described, a web index may comprise terms and phrases associated with the content maintained in the web index, such as word/location pairs indicating the web pages, documents, URLs, etc., associated with one or more words. The indexing component 107 may traverse the web index to identify one or more index entries with words that match or are similar to the captions, subtitles, or emotes associated with the one or more segments of the one or more DVD VOB files of a given DVD. The indexing component 107 may supplement the one or more identified index entries with the one or more segments of the one or more DVD VOB files of the DVD.

A user of a client device 124a, 124b, and 124c communicatively coupled to the network 122 who desires to retrieve or locate content may submit a query, comprising one or more terms or phrases, to the search provider 100. According to one embodiment of the invention, a client device 124a, 124b, and 124c is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 124a, 124b, and 124c typically run software applications (such as a web browser) that provide for transmission of queries to the search provider search provider 100, as well as receipt and display of result sets responsive to the queries.

A query submitted by a user of a client device 124a, 124b, and 124c to the search provider 100 is delivered to the search engine 101. The search engine 101 performs a search of the index data store 105 to identify one or more items of content responsive to the given query. According to one embodiment of the invention, the search engine 101 performs a search of the one or more indices in the index data store 105 to identify content responsive to a given query. For example, a given query received from a client device 124a, 124b, and 124c may comprise the terms "Batman car chase." The search engine 101 may perform a search of the index data store 105 to identify one or more index entries that are responsive to the one or more terms comprising the query.

According to one embodiment of the invention, the search engine 101 may retrieve the one or more video clips and thumbnails from the index entries identified as responsive to a given query received from a given client device 124a, 124b, and 124c. Similarly, the search engine 101 may retrieve a description of the one or more video clips and thumbnails identified as responsive to the given query. For example, the search engine 101 may retrieve the subtitles, captions, emotes and metadata associated with a given index entry identified as responsive to the query. The subtitles, captions, emotes, and metadata may be used to provide the user with a description of the content identified as responsive to the given query.

According to another embodiment of the invention, the search engine 101 retrieves the one or more web pages, documents, URLs, etc., from the one or more index entries identified as responsive to a given query received from a given user's client device 124a, 124b, and 124c. The search engine 101 may also retrieve the one or more video clips and thumbnails from the index entries identified as responsive to the query. Alternatively, or in conjunction with the foregoing, the search engine may identify the location of the one or more video clips and thumbnails from the index entries identified as responsive to the query and generate links to the respective video clips and thumbnails. The search engine 101 may generate a search results page comprising the one or more web pages, documents, URLs, etc., identified as responsive to the query, as well as the one or more video clips and thumbnails or links to the one or more video clips and thumbnails associated with the one or more search results. The user with which the query originated may be presented with the search results page and may view the one or more web pages, documents, URLs, etc., as well as the one or more corresponding video clips and thumbnails.

The system illustrated in FIG. 1 further includes local 110 and remote 111 advertisement data stores, which are operative to maintain one or more advertisements that may be associated with the one or more DVD content items maintained in local 108 and remote 109 data stores. The advertisement data stores 110 and 111 may contain a plurality of advertisements and advertisement formats, such as images, URLs, banners, pop-ups, etc. The search engine 101 at the search provider 100 may be further operative to supplement the one or more content items identified as responsive to a given query with one or more advertisements obtained from the advertisement data stores 110 and 111.

According to one embodiment of the invention, the search engine 101 utilizes the one or more items of metadata associated with a given index entry identified as responsive to a given query to retrieve one or more advertisements from the advertisement data stores 110 and 111. For example, a given metadata item may identify the title of the content associated with a given index entry, such as "Batman." The search engine 101 may perform a search of the local and remote advertisement data stores 110 and 111, respectively, to identify one or more advertisements associated with the term "Batman." The one or more advertisements associated with the term "Batman" may comprise banner advertisements, URLs to Internet stores offering Batman products, video advertisements, images, etc. According to another embodiment of the invention, the search engine 101 may utilize the one or more terms comprising a given query received from a client device 124a, 124b, and 124c to retrieve one or more advertisements from local 110 and remote 111 advertisement data stores. For example, a given query received from a client device 124a, 124b, and 124c may comprise the terms "Spiderman fight scene." The search engine 101 may utilize the term "Spiderman" from the received query to select one or more advertisements.

According to a further embodiment of the invention, the search engine 101 may utilize the profile of a given user to retrieve one or more advertisements in response to a given query. For example, the search provider 100 may maintain profiles for the one or more users of client devices 124a, 124b, and 124c who submit queries to the search provider 100. Similarly, profiles may be stored on the one or more client devices 124a, 124b, 124c associated with a given user and transmitted to the search provider 100 in conjunction with a query from the respective user. The search engine 101 may utilize the profile of a given user to select one or more advertisements from the local 110 and remote 111 advertisement data stores. For example, a given user profile may indicate that the user enjoys science fiction movies and shows. In response to a query from the user, the search engine 101 may retrieve one or more advertisements offering products associated with science fiction, such as one or more advertisements for science fiction DVDs.

The one or more items of content identified as responsive to a given query, as well as the one or more selected advertisements, may be delivered to a client device 124a, 124b and 124c of a given user. The user may interact with the content and advertisements by viewing one or more of the video clips or thumbnails responsive to the user's query or selecting an advertisement offering products or services related to the user's query. For example, a user may select a given video clip, which may result in the execution of an application operative to display the given video clip. Similarly, a user may select an advertisement displayed on the user's client device, which may result in the user being redirected to a webpage associated with the advertisement selected.

Figure 2:
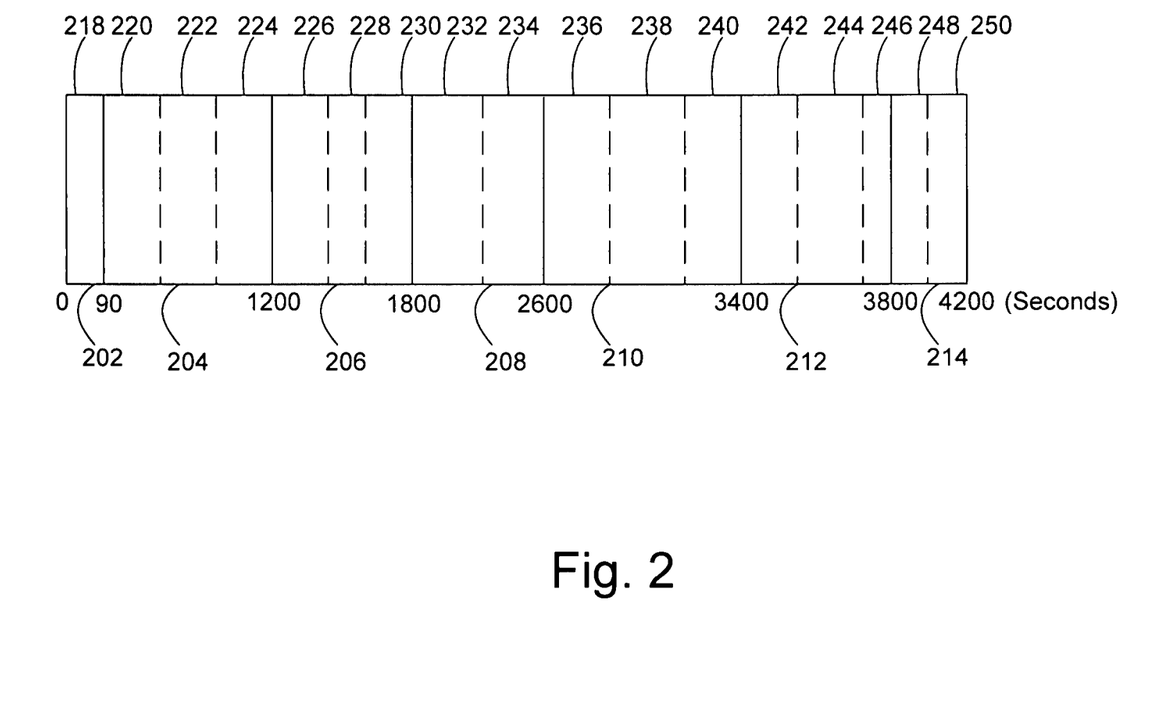
FIG. 2 is a block diagram illustrating the one or more items of digital video content comprising a given storage media item according to one embodiment of the present invention.

FIG. 2 is a block diagram illustrating one embodiment of a DVD content item comprising one or more DVD VOB files. As illustrated in FIG. 2, a DVD may comprise one or more DVD VOB files 202a, 202b, 202c, 202d, 202e, 202f, and 202g. Each DVD VOB file may comprise a portion of a given DVD and may contain video, audio, subtitle and captioning content. For example, in the embodiment illustrated in FIG. 2, DVD VOB file 202a may comprise the opening credits of a movie, DVD VOB file 202b may comprise the first 1,110 seconds of the movie, DVD VOB file 202c may comprise the next 600 seconds of the movie, DVD VOB file 202d may comprise the next 800 seconds of the movie, etc.

One or more segments 218, 220, 222, 224, 226, 228, 230, 232, 234, 236, 238, 240, 242, 244, 246, 248, and 250 containing captioning and subtitle information may be generated for each of the one or more DVD VOB files 202a, 202b, 202c, 202d, 202e, 202f, and 202g comprising a given DVD. The one or more segments 218, 220, 222, 224, 226, 228, 230, 232, 234, 236, 238, 240, 242, 244, 246, 248, and 250 generated may contain subtitles and captions that may be used to identify or describe corresponding audio and video content.

In the embodiment illustrated in FIG. 2, each DVD VOB file is associated with a given period of time. For example, DVD VOB file 202b has a start timestamp of 90 seconds and a stop timestamp of 1200 seconds. Similarly, DVD VOB file 202d has a start timestamp of 1800 seconds and a stop timestamp of 2600 seconds. The timestamp information associated with each DVD VOB file 202a, 202b, 202c, 202d, 202e, 202f, and 202g may be used to identify the timestamp information associated with a given segment 218, 220, 222, 224, 226, 228, 230, 232, 234, 236, 238, 240, 242, 244, 246, 248, and 250 of captioning and subtitle data and corresponding video clip or thumbnail data.

Figure 3:
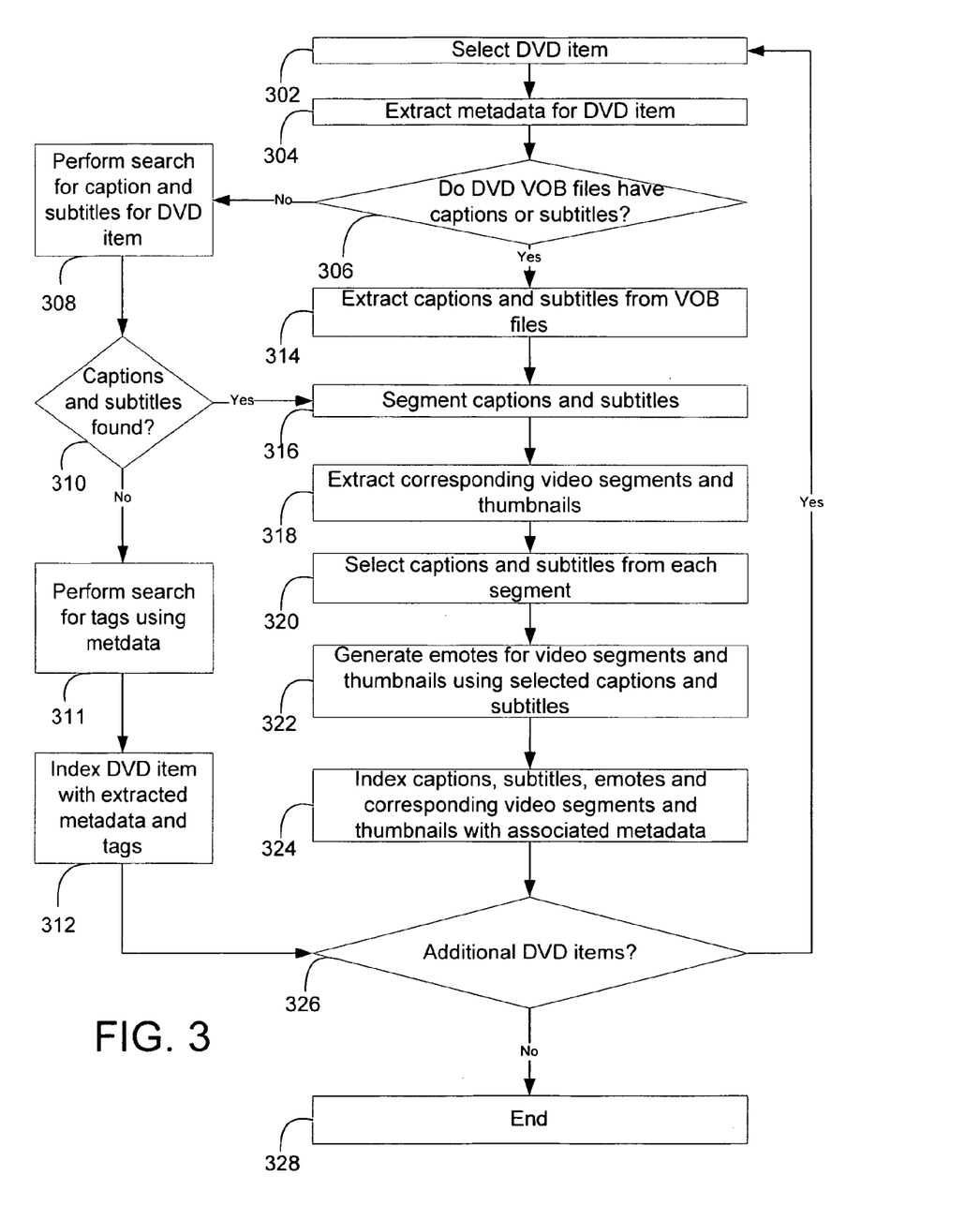
FIG. 3 is a flow diagram presenting a method for extracting and indexing the variety of digital video content maintained on one or more storage media items according to one embodiment of the present invention.

FIG. 3 is a flow diagram illustrating one embodiment of a method for extracting and indexing digital video content maintained on a given storage media item, wherein a storage media item may comprise a DVD. According to the embodiment illustrated in FIG. 3, a given item of DVD content is selected, step 302. Items of DVD content may be acquired from, for example, one or more databases, a physical DVD, etc. Metadata associated with the selected DVD item is extracted, step 304. The metadata associated with a given DVD item may comprise information describing the DVD content, such as the title, director, producer, etc., of the DVD content.

The selected DVD item may comprise one or more DVD VOB files, wherein each DVD VOB file may contain video, audio, captioning and subtitle content in one or more languages. A check is performed to determine whether the one or more DVD VOB files comprising the selected DVD item contain captions or subtitles, step 306. The captions or subtitles in a given DVD VOB file may comprise ASCII or Unicode characters forming one or more terms and phrases in one or more languages corresponding to the audio and video content in the DVD VOB file. If the one or more DVD VOB files comprising the selected DVD item contain captions and subtitles, the caption and subtitles are extracted, step 314. As previously described, the extracted subtitle and captioning data may comprise characters, such as Unicode or ASCII characters, forming one or more terms and phrases in one or more languages.

Where the one or more DVD VOB files comprising the selected DVD item do not contain any captions or subtitles, a search is performed to locate captions and subtitles associated with the selected DVD item, step 308. For example, a search of the Internet may be performed to locate and retrieve caption and subtitle content associated with the DVD item selected. A check is thereafter performed to determine whether caption and subtitle content was found corresponding to the selected DVD item, step 310. If captioning and subtitle content for the selected DVD item are not found, a search is performed for one or more tags associated with the DVD item, step 311. Tags associated with a DVD item may comprise terms or phrases describing the DVD item. According to one embodiment of the invention, a search for tags is performed using the one or more metadata items associated with the DVD item. For example, the title of the given DVD item may be used to perform a search via the Internet for one or more tags providing a summary or description of the DVD item. The DVD item is thereafter indexed with the metadata and tags associated with the DVD item, step 312. For example, the DVD item may be indexed with metadata identifying the title, producer, actors, etc., associated with the DVD item, as well as the one or more tags providing a description or summarization of the DVD item.

If captioning and subtitle content for the selected DVD item are found, or after the captions and subtitles for the selected DVD item have been extracted from the one or more DVD VOB files comprising the DVD item, the subtitle and captioning data for the selected DVD item are segmented into one or more segments, step 316. According to one embodiment of the invention, the one or more segments are generated using a time threshold. For example, a segment may be generated for every N seconds of subtitle and caption content for the one or more DVD VOB files comprising the DVD item.

According to another embodiment of the invention, the one or more segments are generated using a size threshold. For example, a segment may be generated for every N bytes of subtitle and caption data for the one or more DVD VOB files comprising the DVD item. According to a further embodiment of the invention, the one or more segments are generated using divisions identified within the one or more DVD VOB files comprising the DVD item. For example, one or more segments may be generated for the one or more scenes or chapters within the one or more DVD VOB files.

Associated with each of the one or more segments are start and stop timestamps that may be used to extract corresponding video clips and thumbnails, step 318. For example, a given segment of subtitles and captions may have a start timestamp of 910 seconds and a stop timestamp of 1,210 seconds, indicating that the segment comprises 300 seconds of subtitle and caption content. The 300 second video clip corresponding to the 300 seconds of subtitle and caption content may be extracted using the start timestamp 910 and the stop timestamp 1,210 associated with the subtitle and caption segment. Alternatively, or in conjunction with the foregoing, one or more thumbnails may be extracted based upon the timestamp data associated with a given segment. For example, one or more individual video frames may be selected from the video content appearing from the start timestamp 910 and the stop timestamp 1,210.

One or more subtitle terms or phrases and one or more caption terms or phrases are thereafter selected from each of the one or more segments generated for the one or more DVD VOB files comprising the DVD item, step 320. The one or more subtitle terms or phrases selected from the one or more DVD VOB file segments may be selected based upon the frequency of the one or more subtitle terms or phrases within a given segment. For example, the one or more subtitle terms or phrases that appear at least N times in a given segment may be selected. Additionally, one or more caption terms or phrases may be selected based upon the display duration of the one or more captions in a given segment. For example, the one or more captions with display durations exceeding a given time threshold may be selected based upon the start and stop timestamps associated with the one or more captions, wherein the start and stop timestamps associated with a given caption indicate when the caption is displayed within a given DVD VOB file segment.

The selected subtitles and captions are used to generate one or more "emotes," step 322. According to one embodiment of the invention, an emote comprises a description of the video and audio content associated with a given DVD VOB file segment. The one or more emotes may be generated using an emote index, which may be operative to maintain one or more terms associated with one or more captions or subtitles. For example, a given entry in the emote index may comprise the caption <dog barking> and one or more terms or phrases associated with the caption, such as "animal," "dogs," etc. Similarly, a given entry in the emote index may comprise the subtitle "drop the gun" and one or more terms or phrases associated with the subtitle, such as "police," "shooting," etc. The one or more terms or phrases associated with the selected captions and subtitles may be used to generate emotes for the corresponding video and audio content of a given segment. For example, the emote "shooting scene" or "police scene" may be generated for the video and audio content associated with the subtitle "drop the gun" for a given DVD VOB file segment. Similarly, the emote "animal scene" or "dog scene" may be generated for the video and audio content associated with the caption <dog barking> for a given DVD VOB file segment.

The selected subtitles, captions, and emotes are indexed with the corresponding video clips and thumbnails, step 324. Indexing the captions, subtitles, and emotes with the corresponding video clips and thumbnails provides for the storage of video content with an associated textual description of such content. For example, a given index entry may comprise the caption <dogs barking>, the subtitle "walk the dog," and an emote "animal scene," with a corresponding video clip and one or more thumbnails.

According to the embodiment illustrated in FIG. 3, the selected subtitles, captions, emotes and corresponding video clips and thumbnails are indexed using the metadata associated with the selected DVD item. For example, the one or more index entries generated for the one or more segments of a given DVD item may be annotated with or mapped to the metadata item "title" associated with the DVD item, thereby identifying the one or more segments as elements of a common DVD item. A check is thereafter performed to determine whether there are one or more DVD items to be indexed, step 326. If one or more DVD items require indexing, another DVD item is selected, step 302. After all DVD items have been indexed, processing terminates, step 328.

Figure 4:
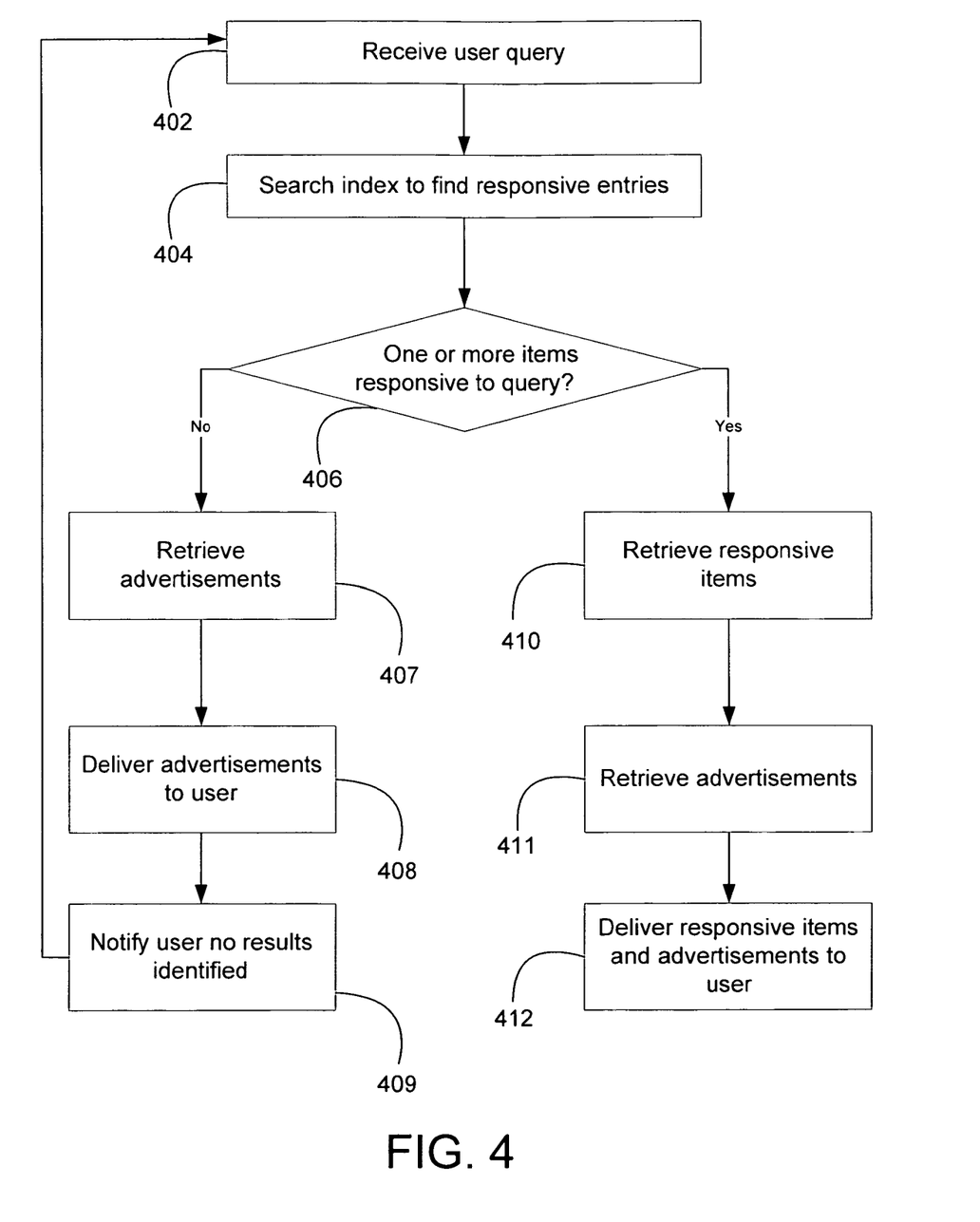
FIG. 4 is a flow diagram presenting a method for receiving a user search query and identifying one or more indexed items of digital video content responsive to the given query according to one embodiment of the present invention.

FIG. 4 illustrates one embodiment of a method for receiving a user search query and identifying one or more indexed items of DVD content responsive to the given query. According to the embodiment illustrated in FIG. 4, a user search query is received, step 402. A user search query may comprise one or more terms entered by a user of a client device. One or more indices maintaining subtitles, captions, emotes and metadata with corresponding video clips and thumbnails are searched to identify one or more items of content responsive to the received query, step 404. According to one embodiment of the invention, the one or more indices are searched to identify one or more index entries that have subtitles, captions, emotes or metadata terms that match or are similar to the terms comprising the received query.

A check is performed to determine whether one or more index entries were identified as responsive to the received query, step 406. If no index entries are identified as responsive to the received user search query, a search is performed to identify and retrieve one or more advertisements for delivery to the respective user, step 407. According to one embodiment of the invention, a search is performed for advertisements using the one or more terms comprising the query received. For example, a given query may contain the term "Spiderman," which may be used to search for one or more advertisements associated with the term. According to another embodiment of the invention, a search is performed for advertisements using the profile of the user associated with the received query. For example, a user profile may indicate user preferences, geographic location, age, sex, etc. One or more advertisements may be retrieved based upon information maintained in a given user's profile. The one or more advertisements are delivered to the user associated with the received query, step 408. Additionally, the user is notified that no items of content responsive to the user's query were identified, step 409. The user may thereafter elect to refine the query or generate a new query, step 402.

Where one or more index entries are identified as responsive to the received user search query, the content items from the one or more index entries are retrieved, step 410. For example, if a given user submits the query "Batman car chase," the index may be searched for one or more index entries that contain terms that match or are similar to the terms comprising the user search query. A given index entry may contain subtitle, caption, emotes and metadata items that match or are similar the to the terms comprising the query. For example, a given index entry may contain the caption data "<car starts>," the subtitle "jump in the car," the emote "car chase scene," and the metadata item "title," identifying the title of the DVD content associated with the index entry as "Batman." The index entry may further contain a corresponding video clip and one or more thumbnails, which may be retrieved for delivery to the respective user.

A search is thereafter performed to determine whether one or more advertisements are associated with the one or more items of content responsive to the received query, step 411. According to one embodiment of the invention, a search is performed for one or more advertisements using the one or more metadata items associated with the one or more index entries identified as responsive to the given search query. For example, a given index entry identified as responsive to a given query may contain title information for a given DVD movie, such as "Superman." A search may be performed for one or more advertisements associated with the title "Superman." Alternatively, or in conjunction with the foregoing, a search may be performed for one or more advertisements using the one or more terms comprising a given query. For example, a given query may comprise the terms "Star Wars fight scenes." A search may be performed using the terms "Star Wars" to identify and select one or more associated advertisements associated with the query terms. The one or more advertisements retrieved may comprise banner advertisements, URLs, pop-up advertisements, etc.

The one or more video clips or thumbnails responsive to the given query, as well as the one or more selected advertisements, may be delivered to and displayed upon the user's client device, step 412. The user may view the video clips or thumbnails associated with a given search result, as well as view or select the one or more advertisements associated with the results displayed to the user.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention and various embodiments with various modifications as are suited to the particular use contemplated. Thus, the foregoing disclosure is not intended to be exhaustive or to limit the invention to the precise forms disclosed and those of skill in the art recognize that many modifications and variations are possible in view of the above teachings.

What is claimed is:

1. A method for retrieving web content relating to one or more items of video content maintained on a storage media item, the method comprising:
    extracting at least one of caption and subtitle content associated with the one or more items of a video content;
    segmenting the extracted at least one of caption and subtitle content into one or more text segments;
    generating a description characterizing the video content based on the one or more text segments;
    receiving a query for one or more items of the video content from a user;
    retrieving the description and at least one text segment based on the query;
    retrieving one or more related items of web content corresponding to the at least one text segment; and
    providing the one or more related items of web content and the video content with the description and the at least one text segment to the user.

2. The method of claim 1 wherein segmenting the extracted at least one of caption and subtitle content comprises segmenting the at least one of caption and subtitle content using a time threshold.

3. The method of claim 1 wherein segmenting the extracted at least one of caption and subtitle content comprises segmenting the at least one of caption and subtitle content based upon preexisting divisions in the video content associated with the extracted caption and subtitle content.

4. The method of claim 1 wherein segmenting the extracted at least one of caption and subtitle content comprises segmenting the at least one of caption and subtitle content using one or more stop words.

5. The method of claim 1 wherein segmenting the extracted at least one of caption and subtitle content comprises identifying start and stop timestamps for a given text segment.

6. The method of claim 1 wherein extracting the at least one of caption and subtitle content comprises selecting one or more captions based upon a display duration of the one or more captions in a given text segment.

7. The method of claim 6 wherein extracting the at least one of caption and subtitle content comprises selecting one or more subtitles based upon a frequency of the one or more subtitles in a given text segment.

8. The method of claim 7 comprising:
    querying an index maintaining one or more index entries identifying terms or phrases associated with the selected one or more captions from the one or more text segments;
    retrieving one or more of the terms or phrases associated with the selected one or more captions; and
    retrieving one or more related items of web content corresponding to the selected one or more captions using the one or more retrieved terms or phrases.

9. The method of claim 1 wherein the one or more related items of web content include advertisements associated with the extracted at least one of caption or subtitle content.

10. The method of claim 1 comprising retrieving the one or more related items of web content corresponding to the one or more text segments of video content using one or more items of metadata associated with the video content.

11. The method of claim 1, wherein the caption content, the subtitle content, the description and the video content are indexed associated with the one or more text segments.

12. A system for retrieving web content relating to one or more items of video content maintained on a storage media item, the system comprising:
    a content acquisition module operative to retrieve the digital video content maintained on the storage media item;
    an extraction module operative to:
    extract at least one of caption and subtitle content associated with the one or more items of digital video content,
    segment the extracted at least one of caption and subtitle content into one or more text segments, and
    generate a description characterizing the video content based on the one or more text segments; and
    a search engine operative to:
    receive a query for one or more items of the digital video content from a user,
    retrieve the description and at least one text segment based on the query,
    retrieve one or more related items of web content corresponding to the at least one text segment, and
    provide the one or more related items of web content and the video content with the description and the at least one text segment to the user.

13. The system of claim 12 wherein subtitle content comprises a textual translation of a dialogue in a given digital video content.

14. The system of claim 12 wherein captioning content comprises a description of non-dialogue audio content in a given digital video content.

15. The system of claim 12 wherein the extraction module is operative to:
   identify preexisting divisions in a given digital video content; and
   segment the extracted at least one of caption and subtitle content from the digital video content according to the preexisting divisions.

16. The system of claim 12 wherein the extraction module is operative to segment the extracted at least one of caption and subtitle content from a given digital video content using a time threshold.

17. The system of claim 12 wherein the one or more related items of web content include advertisements associated with the extracted at least one of caption and subtitle.

18. The system of claim 12 wherein the extraction module is operative to identify start and stop timestamps for the one or more text segments of extracted at least one of caption and subtitle content.

19. The system of claim 18 wherein the extraction module is operative to extract video and audio content corresponding to a given text segment using the start and stop timestamps associated with the text segment.

20. The system of claim 12 wherein the search engine is operative to:
   query an index maintaining one or more index entries identifying terms or phrases associated with one or more captions;
   retrieve the one or more terms or phrases associated with the one or more captions; and
   retrieve the one or more related items of web content corresponding to the one or more captions using the one or more retrieved terms or phrases.

21. The system of claim 12 wherein the search engine is operative to retrieve the at least one of captions, subtitles, and the one or more related items of web content corresponding to the one or more text segments of video content using one or more items of metadata associated with the digital video content.

* * * * *